Aug. 20, 1940.  T. W. CLARK  2,211,880

INVERTED BUCKET STEAM TRAP

Filed July 22, 1939

INVENTOR
THEODORE W. CLARK
BY
Hyde, Higley & Meyer
ATTORNEYS

Patented Aug. 20, 1940

2,211,880

UNITED STATES PATENT OFFICE 2,211,880

INVERTED BUCKET STEAM TRAP

Theodore W. Clark, Cleveland, Ohio, assignor to The Clark Manufacturing Company, Cleveland, Ohio, a corporation of Ohio Application July 22, 1939, Serial No. 285,986

8 Claims. (Cl. 137—103)

This invention relates to improvements in steam traps and more particularly to improvements in operating mechanism for the discharge valve of a float operated trap.

One of the objects of the present invention is to provide an improved leverage connecting the float of a trap with the discharge valve thereof.

Another object of the invention is to provide operating mechanism between a float and a discharge valve whereby the float is permitted to gain momentum at the start of its discharge movement and thereafter this momentum is applied suddenly through a multiplying leverage to the discharge valve to initiate opening thereof.

Another advantage of the present invention is that it provides a leverage of one mechanical advantage for cracking the discharge valve and thereafter a leverage of a differing mechanical advantage for continuing the opening movement of the discharge valve.

Other advantages of my improved mechanism reside in the specific arrangement of the parts whereby to produce an improved operation of the trap as will more clearly appear from the accompanying specification and drawing and the essential features thereof will be set forth in the claims.

Figure 1:
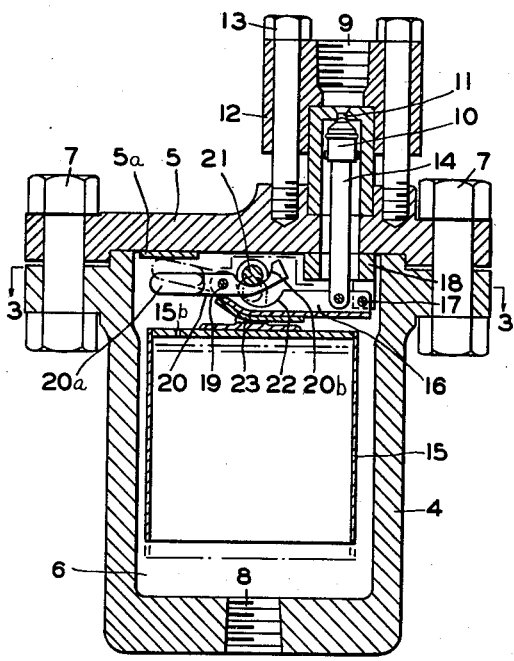
Figure 2:
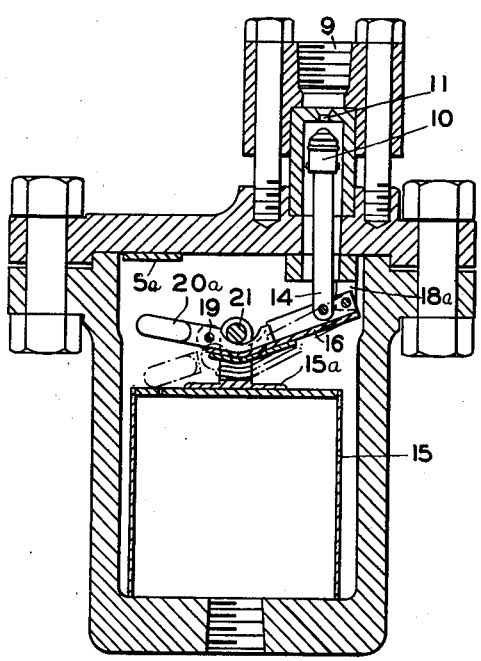
Figure 3:
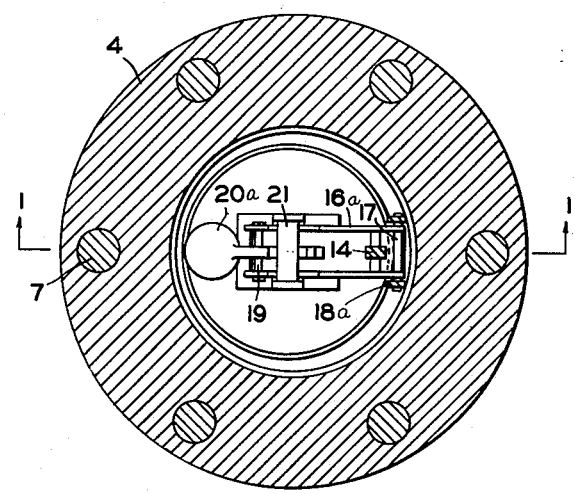

In the drawing, Fig. 1 is a central vertical section through a trap embodying my invention and taken in approximately the position of line 1—1 of Fig. 3; Fig. 2 is a view similar to Fig. 1 showing another position of the operating parts; while Fig. 3 is a horizontal sectional view taken along the line 3—3 of Fig. 1.

My invention is here shown as embodied in a trap of a well known type wherein casing means including a casing body 4 and a casing top 5 provide a float chamber 6. The top is held on the body by suitable bolts 7. It will be understood that a suitable gasket is provided so that a water and steam tight connection is provided between the top 5 and the body 4. The lower portion of the casing body is provided with an inlet connection 8 and the cover is provided with an outlet connection 9. Associated with the outlet connection is a discharge valve 10 coacting with a valve seat 11 to control discharge through the outlet 9. The outlet connection and valve parts are held in position on the cover in a cap 12 secured by cap studs 13. It will be noted in the drawing that suitable alined passages are provided in the cover 5 and in the valve body leading to the valve 10 and its seat 11 and to the outlet connection 9. The valve rod 14 is connected by suitable leverage with a float 15 of the inverted bucket type housed in the float chamber 6. The invention resides in the operating mechanism between float 15 and valve 10 for controlling opening of the valve as the float descends, and closing of the valve as the float rises.

This multiple leverage comprises a first lever 16 of the second order having a fixed fulcrum at 17 supported by the casing. In the present instance the lever 16 is generally channel shape in section and the pin at 17 passes through the flanges 16a of the lever 16 and through ears 18a of a bracket 18 supported by the cover 5. At the point 19 on the longer arm of lever 16 is pivotally supported a second lever 20 which is also a lever of the second order and adapted to be fulcrumed on a portion of the casing 4, 5. Preferably but not necessarily the end 20a of lever 20 is spaced from the abutment 5a on the cover 5 as shown in full lines in Fig. 1 when the float 15 is in its uppermost or buoyant position. The float 15 is provided with a bail 21 overlying the right hand end of lever 20 as viewed in the various drawings. The lever 20 is notched at 20b as shown to receive the bail. It will be noted also that the bail 21 overlies the long arm of lever 16 and the flanges 16a thereof are notched out at 22 to permit travel of the bail 21 before it engages the lever 16. The lever 16 is reinforced on its under side by plate 23 at the point where the flanges are weakened by the notches 22. Float 15 is of the inverted bucket type having a lever-engaging plate 15a on its upper surface and located centrally thereof. The float has a small vent in the top thereof as indicated at 15b as is common in this type of trap. It will be noted that the end 20a of the lever 20 is in the form of a counterweight so as to balance a portion of the weight of float 15 which permits the float to accept more water before it begins to sink.

In normal operation the parts are in the full line position of Fig. 1, and the chamber 6 is substantially filled with water except for the space within the inverted float 15 which is largely filled with steam and air, with a consequent buoyant effect upon the float 15 so that it remains in its uppermost position. The valve 10 is held closed against its seat 11 by pressure in the steam system. Gradually steam condensation and slugs of water entering the inlet connection 8 fill up the space within the float 15 until its buoyancy is overcome. The float then starts to sink having no effect upon the valve until the parts reach the dot-dash position of Fig. 1. At that time the portion 20a engages the abutment 5a providing a fulcrum for lever 20 so that the force supplied by the float at the point 21 is applied at the point 19 to lever 16 with substantially a 3 to 2 mechanical advantage. This force tends to cause a counterclockwise movement of lever 16 about its fulcrum 17 with a mechanical advantage of approximately 6 or 7 to 1. Thus at the moment that the part 20a strikes the abutment 5a the momentum of the moving float is applied suddenly to crack the valve 10 with the mechanical advantage of approximately 9 or 10 to 1. After this happens a little additional downward travel of bail 21 causes it to engage lever 16, whereupon further counterclockwise movement of lever 16 occurs about the point 17 until the parts reach the position of Fig. 2. During this further movement of the parts the lever 20 is carried along but obviously with no further effect after its fulcrum on 20a leaves the abutment 5a. This last valve opening movement occurring after direct engagement of bail 21 with lever 16 is at approximately a mechanical advantage of 4 or 5 to 1 during this additional opening movement of valve 10. With the parts in the full line position of Fig. 2 lever 16 becomes free-floating and will move further downward to the dot-dash position under the influence of its own weight and impelled by counterweight 20a, acting about fulcrum 21 and applying force at 19. As will be well understood by those skilled in this art, with valve 10 open steam passes through the chamber 6, blowing steam and water out of the opening 9 until buoyancy is restored to the float 15, after which it returns to its uppermost position and the valve 10 is returned into engagement with its seat 11 by the rising float.

Several advantages follow from the use of my improved operating mechanism. Because of the multiple leverage providing a great mechanical advantage, the float 15 may be made lighter than is customary in the prior art and therefore the bucket will accept a greater load of water before it drops. Also the counterweight 20a serves to counterbalance part of the weight of the trap so that when the bucket is finally nearly full of water its margin of buoyancy is very narrow and a slight change in water level produces a definite and sharp downward movement of the bucket. Because the bucket is moving before the part 20a strikes the abutment 5a, the momentum of the moving bucket is applied suddenly through the multiple leverage described, producing a cracking of valve 10 which is so positive that no hunting occurs as is quite usual in this type of trap. With a trap the same size as traps of the prior art, the area of the valve opening at the seat 11 may be increased and still produce a satisfactory opening of the valve 10 against the same line pressure because of the efficiency of the operating mechanism in producing valve opening upon dropping of the float 15. I am thus able to produce a trap having more than double the capacity of prior traps of the same size.

What I claim is:

1. In a steam trap, means providing a float chamber having inlet and outlet connections, a discharge valve associated with said outlet connection, a float in said chamber, a first lever having a fixed fulcrum, a second lever pivotally mounted on said first lever and adapted to fulcrum about a point on said means, there being an operative connection between said first lever and said valve independent of said second lever, and an operative connection between said float and said second lever.

2. In a steam trap, means providing a float chamber having inlet and outlet connections, a discharge valve associated with said outlet connection, an inverted bucket float in said chamber and movable between an upper buoyant position and a lower discharge position, a first lever having a fixed fulcrum, an operative connection between said lever and said valve, a second lever pivotally mounted on said first lever and adapted to fulcrum about a point on said means, there being lost motion between said second lever and said fulcrum when said float is in uppermost buoyant position, an operative connection between said second lever and said float, and the parts being so arranged that upon downward movement of said float from buoyant position said second lever moves about its pivot before fulcruming about said point, whereby the momentum of the moving float is applied suddenly to initiate opening of said valve.

3. In a steam trap, means providing a float chamber having inlet and outlet connections, a discharge valve associated with said outlet connection, an inverted bucket float in said chamber and movable between an upper buoyant position and a lower discharge position, a first lever having a fixed fulcrum, an operative connection between said lever and said valve, a second lever having a point of application on said first lever and having a fulcrum on said means, there being an operative connection between said float and said second lever when said float is in buoyant position for applying the weight of said float to said first lever with a mechanical advantage provided by said second lever, and there being an operative connection between said float and said first lever established by downward movement of said float for applying the weight of said float to said first lever directly with less than the mechanical advantage provided by the first effective multiple leverage.

4. The combination of claim 3 wherein lost motion is provided between said second lever and its fulcrum on said means whereby said float attains momentum before said second lever engages its fulcrum.

5. The combination of claim 3 wherein lost motion is provided between said second lever and its fulcrum on said means whereby said float attains momentum before said second lever engages its fulcrum, and counterweight means for normally biasing said second lever out of engagement with its fulcrum.

6. In a steam trap, a casing providing a float chamber having a bottom inlet connection and a top outlet connection, a discharge valve associated with said outlet connection and opening downwardly, an inverted bucket float in said chamber and movable between an upper buoyant position and a lower discharge position, a lever having a fulcrum on said casing, said lever having its shorter arm operatively connected with said valve, a lever mounted at a point on the longer arm of said first named lever for application of force from said second named lever to said first named lever, said second named lever being adapted to fulcrum on a part of said casing, there being a lost motion space between said second named lever and its fulcrum when said float is in buoyant position, and a member connected with said float and overlying the longer arm of said second named lever and overlying and spaced from the longer arm of said first named lever between said mounting point of said second named lever and said fulcrum of said first named lever, whereby said float drops without effect on said valve until said second named lever engages its fulcrum whereupon said valve is cracked with the momentum of said moving float applied with great mechanical advantage through multiple leverage, and after said float engages said first named lever it continues to open said valve with less mechanical advantage through a single lever.

7. The combination of claim 6 including a counterweight biasing said second named lever out of engagement with its fulcrum when said float is in buoyant position.

8. In a steam trap, a casing providing a float chamber having a bottom inlet connection and a top outlet connection, a discharge valve associated with said outlet connection and opening downwardly, an inverted bucket float in said chamber and movable between an upper buoyant position and a lower discharge position, a lever having a fulcrum on said casing, said lever having its shorter arm operatively connected with said valve, a lever mounted at a point on the longer arm of said first named lever for application of force from said second named lever to said first named lever, said second named lever being adapted to fulcrum on a part of said casing, and a member connected with said float and overlying the longer arm of said second named lever and overlying and spaced from the longer arm of said first named lever between said mounting point of said second named lever and said fulcrum of said first named lever, and a counterweight on the fulcrum end of said second named lever.

THEODORE W. CLARK.